Aug. 5, 1969  H. J. NORDSTEDT ET AL  3,458,873
SANITARY ELECTRIC DRY CLOSET
Filed July 11, 1966  7 Sheets-Sheet 6

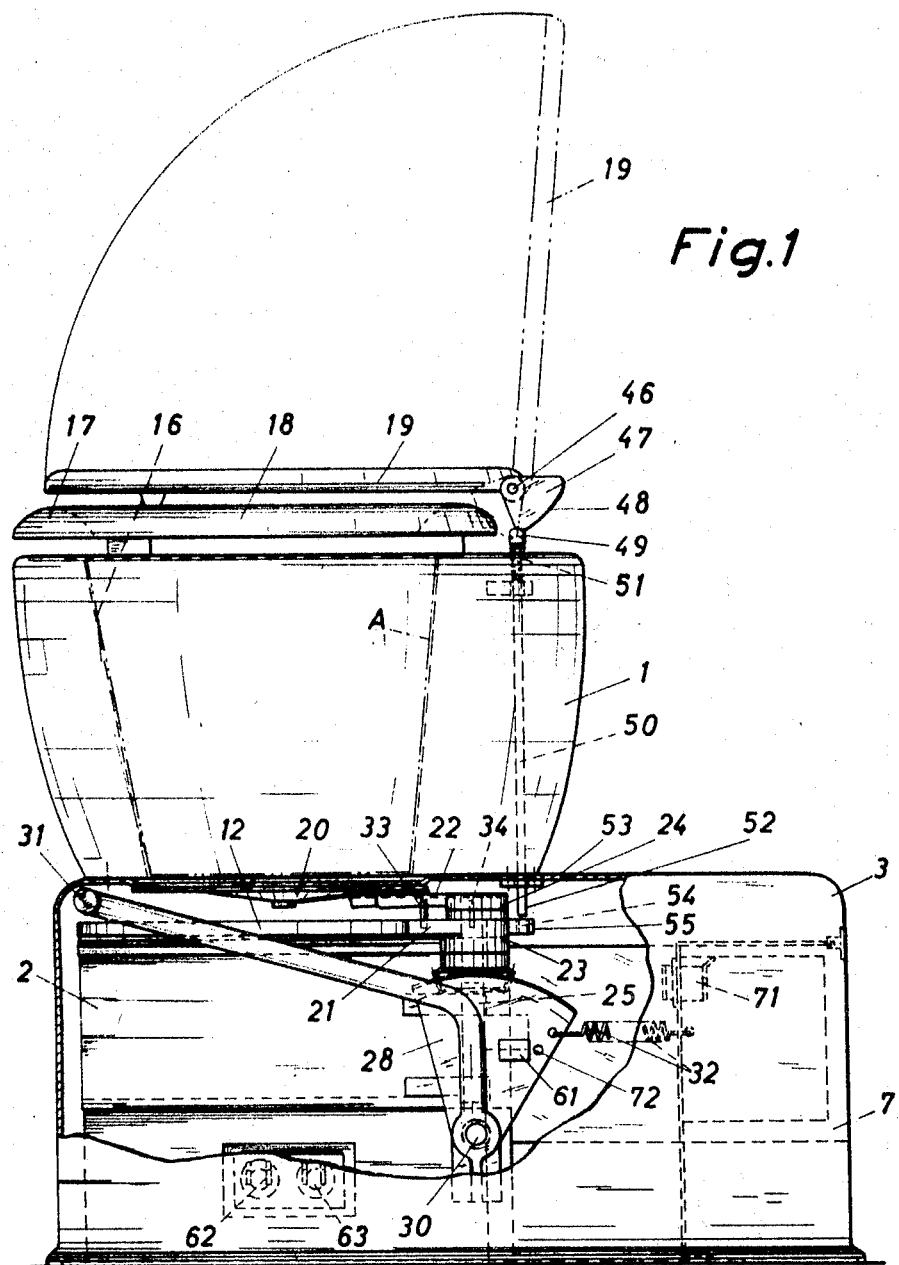

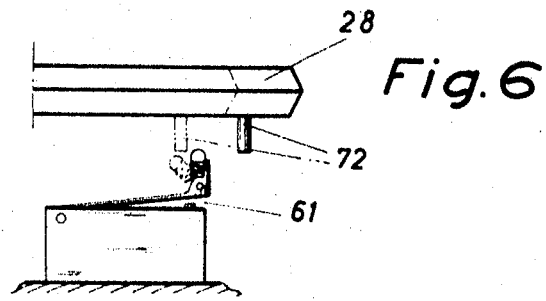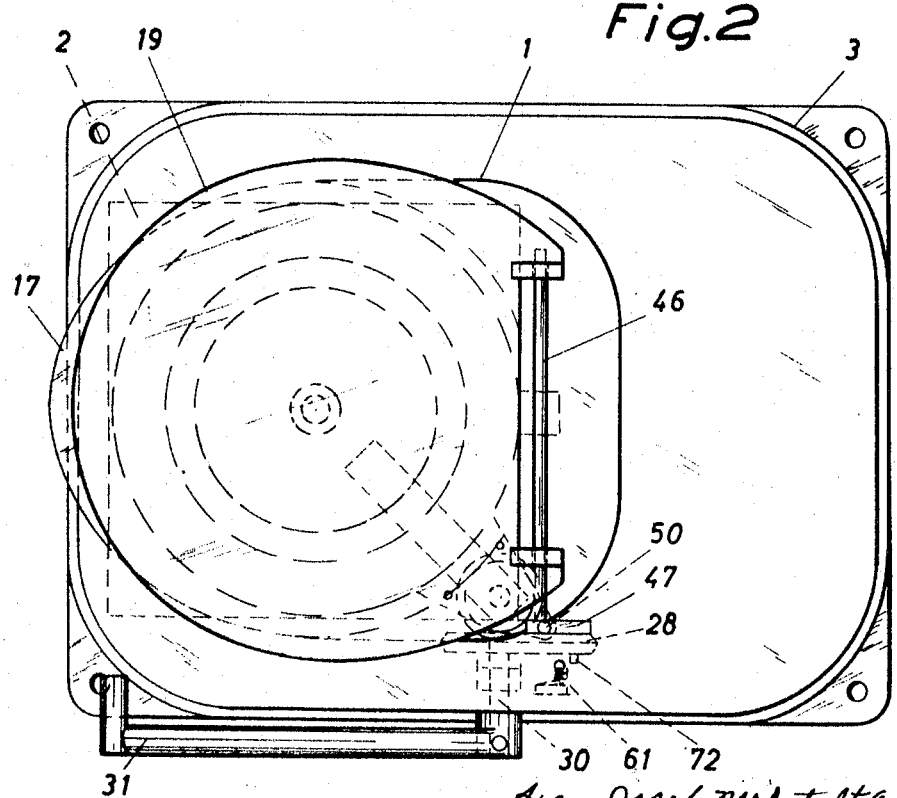

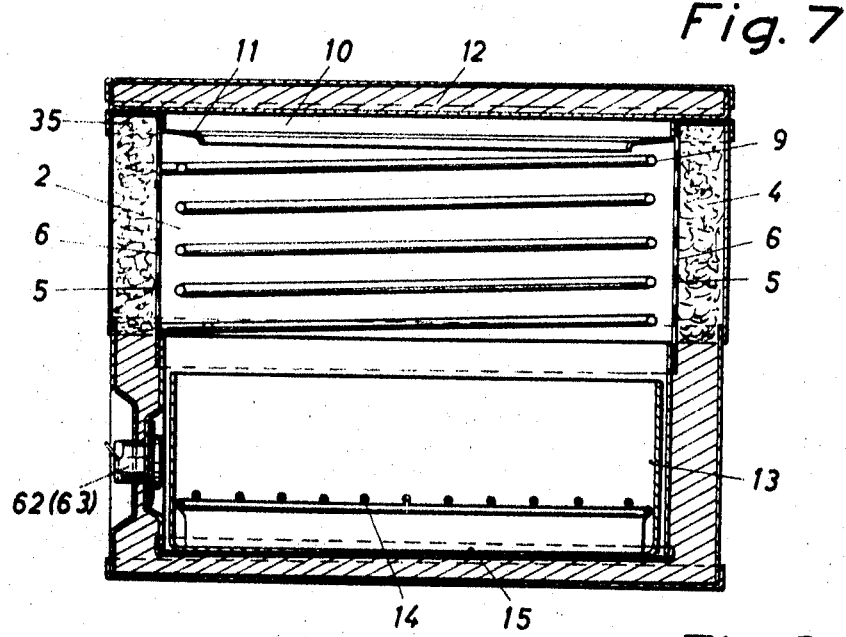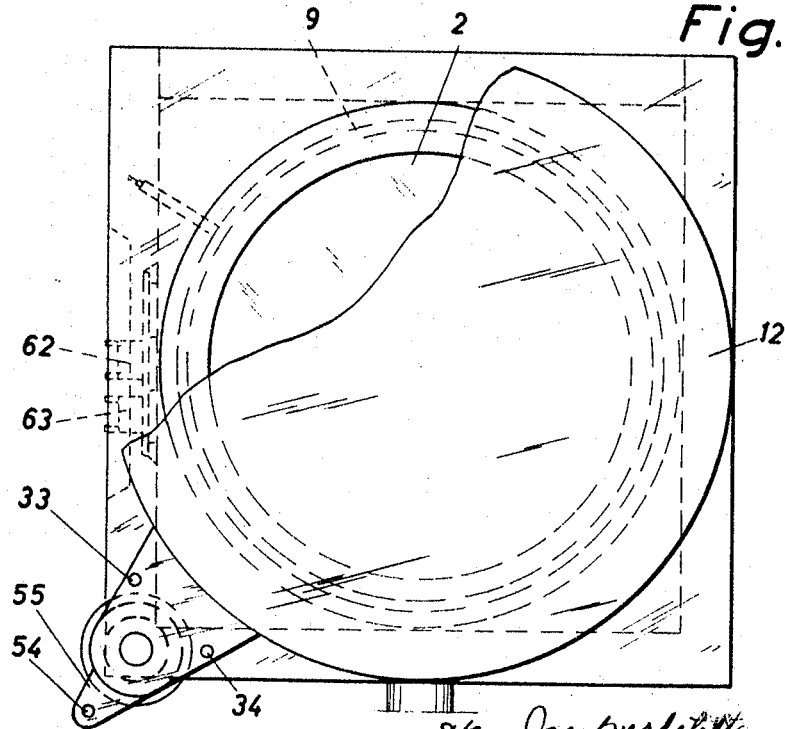

Hans Josef Nordstedt and
Lars Folke Delin,
INVENTORS

BY Wenderoth, Lind
and Ponack,
Attorneys

INVENTORS
HANS JOSEF NORDSTEDT
LARS FOLKE DELIN
BY
Wenderoth, Lind & Ponack
ATTORNEYS 3,458,873
SANITARY ELECTRIC DRY CLOSET
Hans Josef Nordstedt and Lars Folke Delin, Amal,
Sweden, assignors to Aktiebolaget Hakanssons Industrier, Amal, Sweden, a corporation of Sweden
Filed July 11, 1966, Ser. No. 564,151
Claims priority, application Sweden, Aug. 4, 1965, 10,176/65; Nov. 26, 1965, 15,360/65
Int. Cl. A47k *11/02*
U.S. Cl. 4—131                                     15 Claims

ABSTRACT OF THE DISCLOSURE

An electric coupling for electric closets having a combustion chamber for the incineration of faeces. An electric heating element is provided for heating the combustion chamber with a fan and an electric motor for driving the fan. A contactor having a holding coil and a current source is coupled between the poles of the current source and the electric heating element. A plurality of switches controlled by thermostats are under the influence of the temperature in the combustion chamber at the incineration of the faeces. An operation switch is connected in series with the holding coil and the thermostatically controlled switches connected to the contactor before and after the disconnection points of the same. The combustion chamber is provided with a lid to close the operation switch when the lid is in its closing position. The motor for driving the fan is coupled in series with a thermostatically operated switch having one pole also coupled to the heating element after one of the main disconnection points of said contactor.

---

Figure 3:
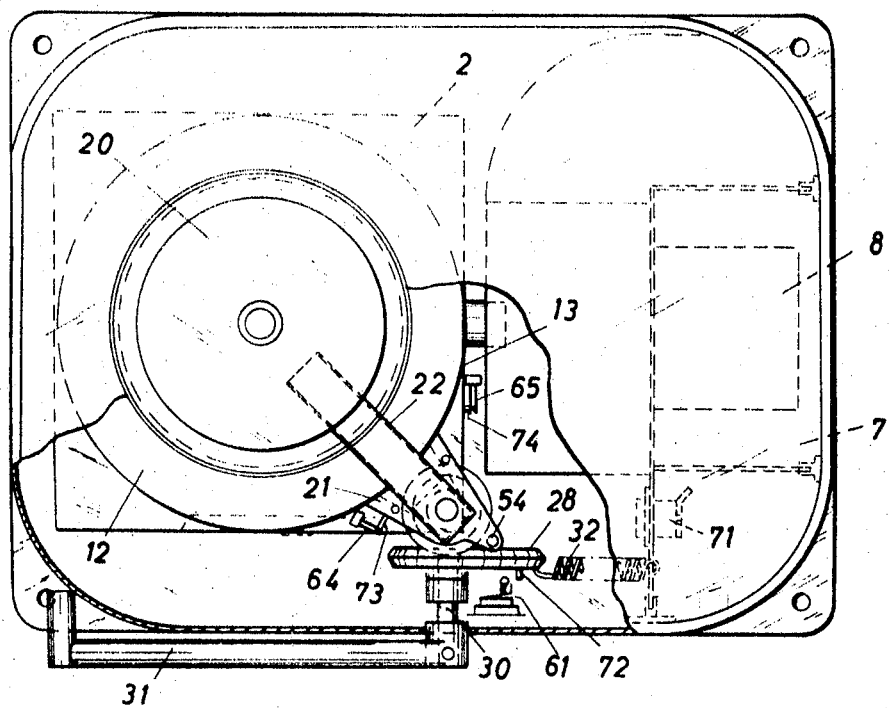

The present invention has reference to an electric coupling for electric closets provided with electric tubular elements for heating a combustion chamber the upper end of which being closeable by means of a lid adapted to be swung away. The closet also comprises a fan driven by means of an electric motor, an ash box arranged at the lower portion of the combustion chamber, a contactor provided with a holding coil and being arranged between the poles of the current source and electric heating elements as well as a number of switches influencing the combustion temperature and controlled by means of thermostats and an operation contact.

An electric dry closet should be operatable wholly automatically, i.e. the combustion procedure must be carried out without any supervision whatsoever and there must not occur any risk for a person using the closet to be burned by the heat created in the combustion chamber. Further, the closet must not product any noticeable smell at operation.

By means of the present invention these problems have been solved in a satisfactory way. The main feature of the invention is to be seen therein that the operating switch which preferably is adapted to be closed when the combustion chamber lid is closed, is coupled in series with the holding coil of the contactor and the switches, controlled by thermostats, and connected to the contacor on one hand before and on the other hand after the disconnection points of the same.

Further, the motor of the fan is with advantage coupled in series with a switch controlled by a thermostat, one pole of said switch being coupled to one pole of the heating element after one of the main disconnection points of the connector.

The aforesaid control switch is inserted in a secondary circuit to the main circuit which comprises the electrical heating element in the combustion chamber. This control switch is arranged in such a way that it closes the secondary circuit—which in turn causes a connecting of the main circuit to the heating element of the combustion chamber—at the returning of the combustion chamber lid to its closing position. For the reason that the combustion chamber lid according to the invention cannot be swung to the side as long as the lid of the closet chair is in its swung up position, there is no risk for a person sitting on the closet chair to be burned by the heat of the combustion chamber for the reason that the combustion chamber lid and the closet chair lid in this position of the closet chair lid cannot be swung to the side, i.e. be opened.

The device also comprises, an already mentioned, a number of switches controlled by thermostats and arranged in such a way that at the exceeding of a certain value of the temperature at the gas exhaust and also at other points the secondary circuit is automatically cut off and the fan, driven by means of an electric motor, is brought to operate in the gas exhaust. After that the current to the heating element of he combustion chamber is disconneced until the exhaust gas temperature has been lowered to a certain predetermined value.

In case the closet is used during a period when one of the switches controlled by thermostats after reaching a certain maximal temperature has cut off the circuit to the heating element, the circuit cannot be reclosed without renewed influence of the operation switch until the temperature in the combustion chamber has been lowered to a certain predetermined lower value. This means that it may happen that faeces remain in the combustion chamber without being incinerated.

According to a preferred embodiment of the invention this drawback has been eliminated. The feature of this embodiment is to be seen therein that the holding coil of an extra contactor is in series with another switch, controlled by thermostats, and a second operation switch connected to the poles of the source of current. At the connection of this second operation switch—which can be carried out by means of a pedal, an operation lever or the like as well as in a common way in connection with a flushing of a water closet—the extra contactor is activated simultaneously as an impulse is stored so as to close the circuit to the holding coil of the main switch when the switch under the control of thermostats of the combustion chamber again is closed when the temperature has reached a point below a predetermined lower temperature value in the combustion chamber.

Figure 4:
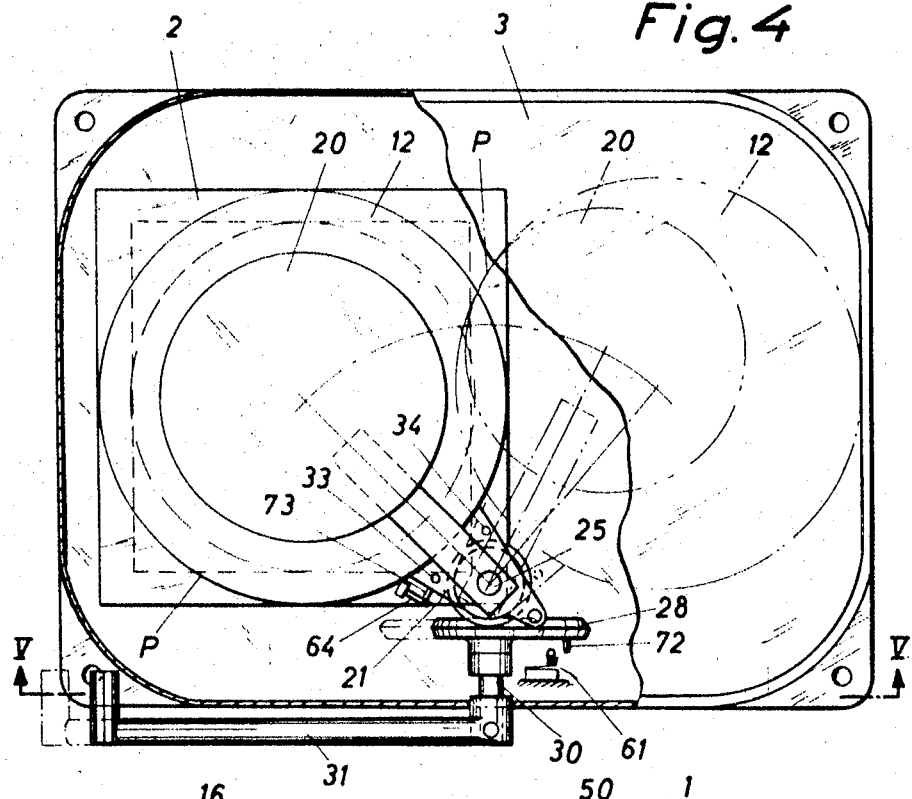
Figure 5:
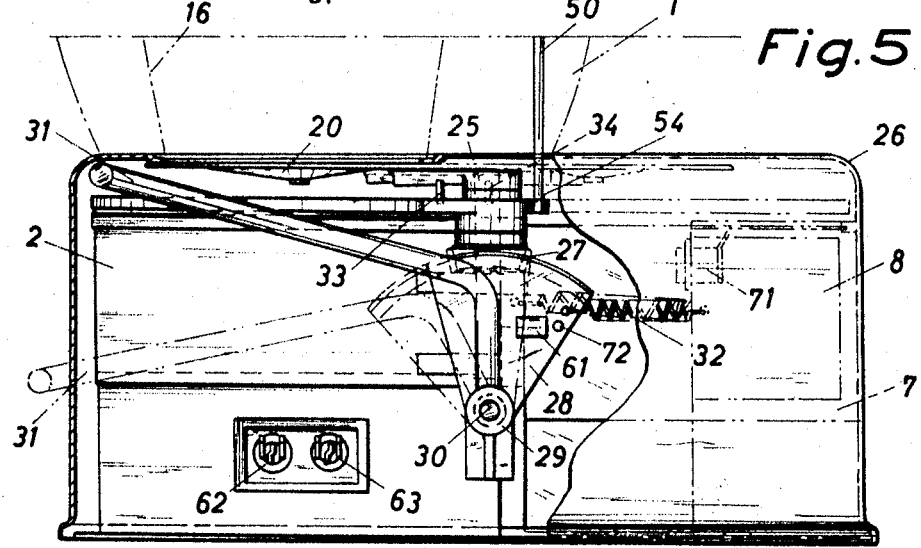
Figure 10:
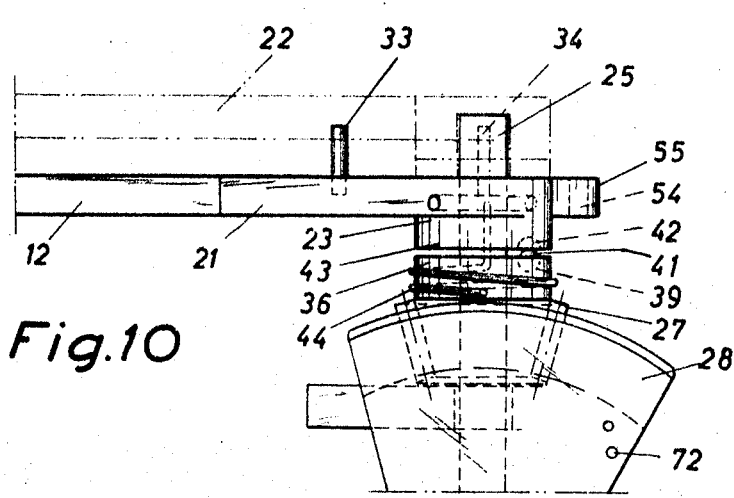
Figure 9:
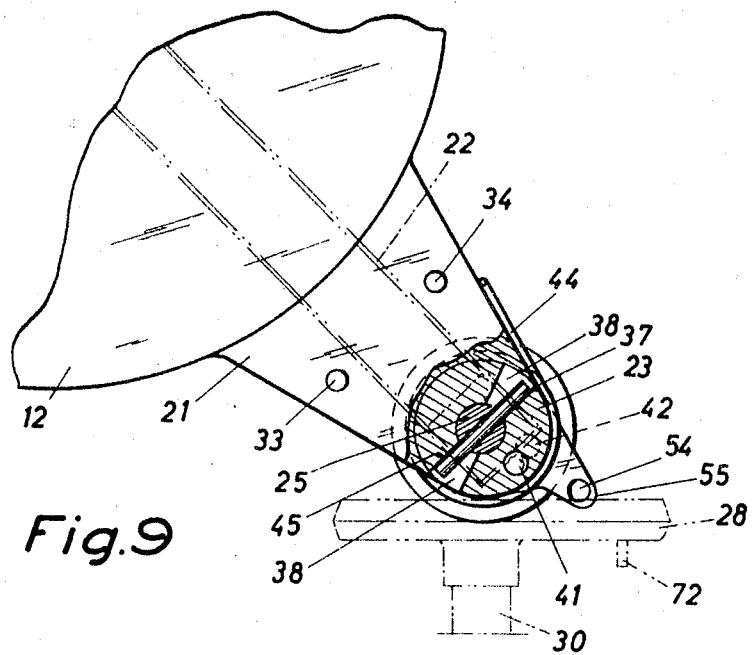
Figure 11:
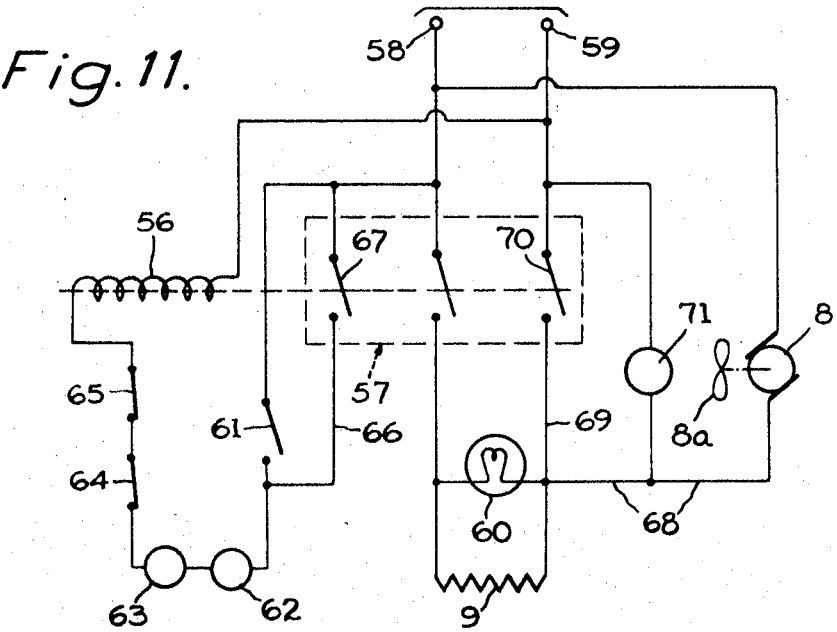
Figure 12:
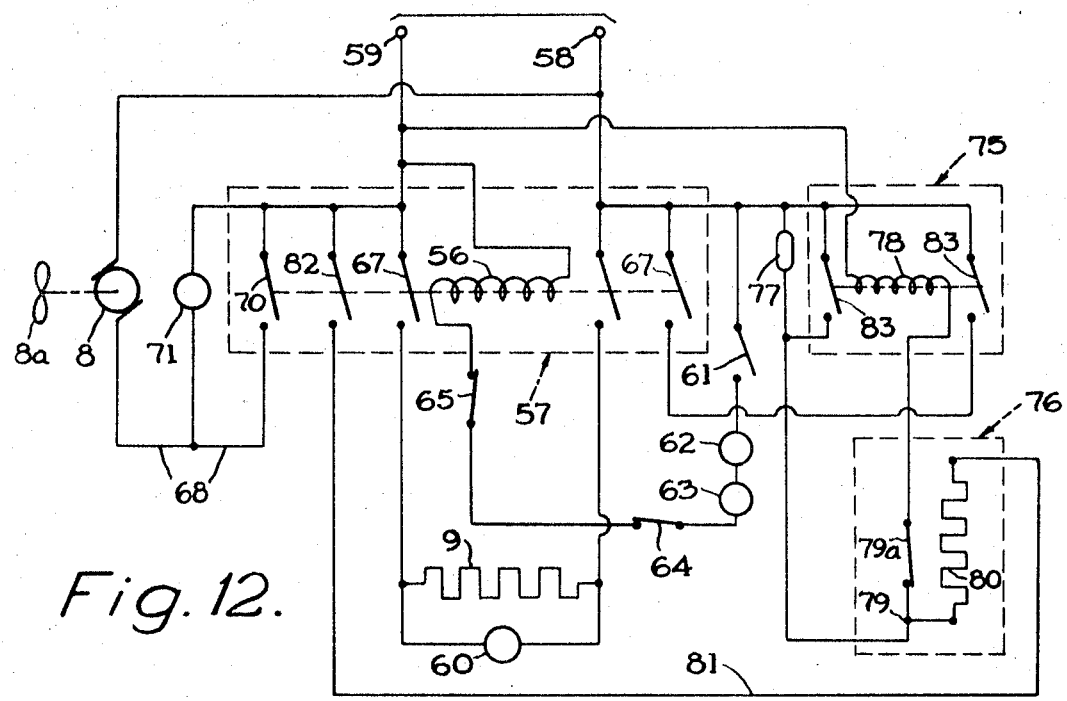

In the following the invention will be described more in detail with reference to the accompanying, partly diagrammatical drawings. In the drawings:

FIG. 1 is a side elevation shown partly in a vertical longitudinal section of an electric closet according to the invention, FIG. 2 is a plan view, FIG. 3 is a plan view shown in a partial horizontal section of the lower portion of the electric closet with the combustion chamber, FIG. 4 is a partly sectioned plan view of the lower part of the closet illustrating the combustion chamber lid in closed and open positions, FIG. 5 shows a vertical section through the lower portion on the line V—V in FIG. 4, FIG. 6 shows on an enlarged scale a plan view of the switch shown at the lower portion of FIG. 3, FIG. 7 shows also on an enlarged scale a vertical section through the combustion chamber with its ash box, FIG. 8 is an enlarge plan view of the combustion chamber, showing part of the lid broken away;

FIG. 9 is a view shown partially in plan and partially in a horizontal section through the device for swinging the combustion chamber lid in a horizontal plane, FIG. 10 is a front elevation view of this device, FIG. 11 shows the electric coupling diagram of the device, and FIG. 12 shows a coupling diagram according to a further development of the invention.

The upper portion 1 of the electric closet, which portion comprises a closet chair, is situated centrally above the combustion chamber 2 in the lower portion 3 of the electric closet. The combustion chamber 2 is insulated on all sides and its side walls are provided with a catalyst element 4 (FIG. 7) in the shape of a filter which comprises $Al_2O_3$. The inner wall 5 of the combustion chamber 2 is provided with perforations 6 through which gases can be sucked out from the combustion chamber by means of a fan 8 driven by an electric motor and arranged in the gas outlet 7. The gas outlet 7 is adapted to be connected to a chimney (not shown). In the combustion chamber 2 there is along the inside of the walls 5 arranged an electrical tube element 9 (FIGS. 7, 8) and a protection sheet 11 is arranged above this element 9 in the vicinity of the upper opening 10 of the combustion chamber 2. The opening 10 has a circular cross section and is adapted to be closed by means of a circular lid 12. In the lower portion of the combustion chamber 2 there could be inserted an ash box 13 provided with a grid 14 situated at a certain distance above the bottom 15 of the ash box 13.

The closet chair 1 is arranged vertically above the combustion chamber 2, and the chair 1 is provided with a conically downwardly tapering inserted portion 16, a seat 17 above the insertion portion 16 and a lid 19 covering the central opening 18 of the seat 17. The lower opening of the inserted portion can be closed by means of a circular lid 20 adapted to be swung to the side.

The combustion chamber lid 12 and the lid 20 are each provided with rearwardly directed arm 21 and 22, respectively, and these arms 21, 22 are with each their hub 23 and 24, respectively, journalled for being freely turnable on the upper end of the drive shaft 25. An intermediate part of the drive shaft 25, this shaft, being journalled in the wall of the combustion chamber 2, carries a conical sprocket 27 (FIG. 5) which cooperates with and is driven by a racked gear segment 28 shaped in a corresponding way, this segment 28 being pivotally attached with its hub 29 on one end of a shaft 30 journalled in the side of a mantle 26 (FIG. 5) enclosing the combustion chamber and the fan 8. The opposite (outer) end of the shaft 30 carries a pedal 31. By means of a helical return spring 32, the racked segment 28 is normally biased in its right (according to FIG. 5) oscillated position with the pedal 31 in lifted position (shown with unbroken lines in FIG. 5). The arm 21 on the combustion chamber lid 12 is provided with two laterally spaced upwardly extending driving pins 33, 34, better seen in FIG. 9, which grip project on either side of the other lid arm 22 in such a way that the lid 12 can be swung sidewardly in relation to the lid 20 a limited amount before this lid 20 responsive to the engagement by the pins 33, 34 is brought to follow the lid 12 when the latter is moved in a lateral direction. The pin 33 is arranged in such a way in relation to the lid arm 22 that the peripheral border of the lid 12 at the point P (FIG. 4) is situated under the corresponding point on the lid 20 before the latter is brought along in the opening up movement.

So as to render it possible for the lid 12 to close tightly against the annular upper border 35 (FIG. 7) of the opening 10 of the combustion chamber 2 the closet also includes a device which permits the lid 12 at the end of the closing movement to sink down to and reset on the border 35 but it is on the other hand forced to be lifted from this border before the opening up movement in lateral direction is started.

There is, in FIGS. 9 and 10, shown a device which renders this possible. The shaft 25 is provided with a ring flange or a shoulder which in the shown embodiment comprises the hub 36 of the sprocket 27. The hub 23 is journalled on the lid arm 21 above the sprocket hub 36. The rotation movement is restricted by means of a pin 37 which in transverse direction is forced into the shaft 25 and with the ends engages two sector-shaped notches 38 in the arm hub 23. There is in a notch 39 in the end surface 40 of the hub 36 inserted a steel ball 41 which when the lid 12 is in closed position engages a corresponding notch 42 in the end surface 43 of the hub 23. In this position the lid 12 rests on the ring border 35. A helical spring 44 which with one end is attached to the hub 23 and with the opposite end is attached to the hub 36 tends to swing the lid 12 to closing position a distance which corresponds to the idle movement of the pin 37 in the notches 38.

When the pedal 31 is pushed down by means of the foot, the racked segment 28 is swung in counter-clockwise direction according to FIG. 5 and turns the sprocket 27 and thus also the shaft 25 whereas the pin 37 initially runs idle in the notches 38 while compressing the spring 44. The ball 41 follows the sprocket 27 and its hub 36 in the movement of the shaft 25 and then it slides out of the notch 42 in the lid arm hub 23. The latter is then lifted together with the lid 12 a distance corresponding to the depth of the notch 42, i.e. some few millimeters, such that the lid will be situated in a position free from the combustion chamber. When at the continued rotation of the shaft 25 the driving pin 37 abuts against one border 45 of the sector-shaped notches 38, the arm 21 and the lid 12 are caused to swing in clockwise direction according to FIG. 9. As soon as the pin 33 abuts against the lid arm 22, the border of the lid 12 will be situated at the point P below the corresponding border of the lid 20, this lid 20 is brought to participate in the opening movement. In FIG. 4 there is shown with dash and dot lines the lid 12 and the lid 20 swung to the side such that a bag having been inserted in the inset portion 16, and adapted to receive human defecation, will fall straight down into the combustion chamber 2 and be caught by the grid 14 (FIG. 7). Here, a complete incineration of the waste takes place and the gases are, by means of the fan 8, sucked out to the chimney.

However, so as to prevent a person using the closet from being burned the invention components are arranged in such a way that a swinging away of the lid 12 and the lid 20 and the connection of the heating element 9 in the combustion chamber 2 cannot be carried out until the closet chair lid 19 is swung down and thus no person can sit on the seat 17. This problem has according to the invention been solved in such a way that the lid 19 or its shaft 46 of rotation is provided with a sector-shaped cam 47 the peripheral border 48 of which abuts against the upper end 49 of a vertical press rod 50 which by means of a helical spring 51 is normally displaced in a direction up against the cam 47. The rod 50 is with its lower end 52 which extends through the upper portion 53 of the housing mantle 3, insertable into an aligned aperture 54 on a rearwardly directed elongation portion 55 on the lid arm 21 (FIG. 9). When the lid 19 has been swung up (shown in dash and dot lines in FIG. 1), the cam 47 is swung in clockwise direction whereas the helically upwards extending border 48 on the cam displaces the rod 50 against the action of the spring 51 with the end 52 down into the aperture 54 and locks thereby the combustion chamber lid 12 in closed position. Thus, the lid 12 cannot be opened by a pressing down of the pedal 31. However, when the closet chair lid 19 is swung down after use (shown in solid lines in FIG. 1), the cam 47 is swung in counter-clockwise direction and then the rod 50 will be lifted by the spring 51 to a position in which the rod end 52 is brought out of engagement with the elongation portion 55. Thus, the combustion chamber lid 12 can now be opened up by means of the pedal 31.

The closet of the invention further comprises a control circuit means for controlling the operation of the electric heating element 9 in the combustion chamber. The circuit means comprises a relay 57 having two switches therein connected between the respective sides 58 and 59 of a power supply, or alternatively to one phase and ground, and the opposite ends of the heating element 9. A control lamp 60 is connected parallel to the heating element 9. An auxiliary circuit is comprised of a holding switch 67 for holding coil 56 of the relay energized, which holding switch 67 and the other two switches of the relay are normally open switches closed by the energizing of the coil 56. Connected in parallel with the holding switch 67 and its connector 66 is a normally open operating switch 61 which is closed by the operating pin 72 on the rack segment 28 when said rack segment is swung clockwise to its initial position after the foot pedal 31 has been pushed down and released. Also connected in series with the coil 56 are normally closed thermostatic switches 62 and 63 which are opened only when the temperature in the combustion chamber reaches 400 or 500° C., and switches 64 and 65. Switch 64 is closed by the laterally directed operating pin 73 on the lid arm 21, and opens when the lid 12 is opened, i.e. is swung clockwise in FIG. 4. The switch 65 is closed by the operating pin 74 on the ash box 13 when the ask box is completely inserted into the combustion chamber 2.

The main control circuit also comprises an electric motor 8a for driving the fan 8, the motor being connected between the one side 58 of the power supply and the connection 69 between one of the relay switches 70 in the other side of the power supply and the heating element 9. A thermostatic switch 71 which is responsive to the temperature of the exhaust gas is connected in parallel with the relay switch 70, and acts to complete the circuit to the fan motor 8a as long as the temperature of the gas exhausted by the fan is above a certain temperature, e.g. 80° C.

In operation, with the ash box 13 fully inserted and switch 65 closed, and the combustion chamber cold so that switches 62 and 63 are closed, when the lid 12 is returned to the closed position, thus closing switch 64, and the rack segment 28 returns to its initial position, switch 61 is momentarily closed, thus energizing coil 56 and closing all the switches in the relay 57. This energizes the heating element 9 and holds the coil 56 energized due to the closing of switch 67. The fan motor 8a will also start to run. This condition will continue until the temperature in the combustion chamber reaches the upper limit set by the switches 62 and 63, at which time these switches will open. This will deenergize coil 56 and disconnect the heating element 9. However, as long as the exhaust gases are above a certain temperature, the thermostatic switch 71 will be closed, thus keeping fan motor 8a energized. If during operation of the heating element, the lid 12 is moved, or the ash box is moved, either the switch 64 or switch 65 will open, and deenergize coil 56, thus deenergizing the heating element 9.

The ash box must be emptied from time to time. The ash is completely sterile and free of germs.

The circuit shown in FIG. 12 is basically the same as that shown in FIG. 11, with corresponding parts having the same reference numbers. In addition to the elements shown in FIG. 11, the circuit of FIG. 12 comprises an added relay means 75, an added thermostatic switch 76, and an added operating switch 77, e.g. a mercury switch, for actuating the added relay means 75. The relay 75 comprises an actuating coil 78 connected across the side 59 of the power supply and the switch 76, and two normally open switches, 83 and 83a. Switch 83 is connected in parallel with operating switch 61 and holding switch 67, while switch 83a is connected in parallel with added operating switch 77 across the side 58 of the power supply and the other side of switch 76 from the coil 78. The thermostatic element 80 of the switch 76 is connected between the one side 79 of the switch and the side 59 of the power supply through a normally open contact 82 which is actuated by the coil 56 of relay 57.

When the heating element 9 in the combustion chamber has been running and has been cut off by the thermostatic switches 62 and 63, and the closet is used again, the last user upon completing use, in addition to actuating the pedal, actuates the operating switch 77. This closes the circuit through the coil 78 of the added relay 75 through the normally closed switch 79a of added thermostatic switch 76. This closes the switches 83 and 83a, the switch 83a holding the coil 78 energized. The closing of the switch 83 completes the auxiliary circuit for energizing the heating element 9, except for the thermostatic switches 62 and 63, and the switch 83 will remain closed. When the combustion chamber cools down enough for the switches 62 and 63 to close, the control circuit is actuated as described above with respect to FIG. 11 to energize the heating element 9. At the same time, the thermostatic element 80 in the switch 76 will be heated by current flowing through the relay switch 82, which has been closed by energizing of coil 56, and after a certain time, e.g. 10 sec., the switch 76 will be opened. Coil 78 is deenergized, and the added relay 75 and added switch 76 are reset to the initial conditions.

The invention has been described in the aforegoing for purposes of illustration only and is not intended to be limited by this description or otherwise except as defined in the appended claims. Thus, the different details of the electric closet may be modified in many ways without departure from the inventive idea. Thus, it is also possible to perform the incineration by means of high-frequent current.

Of course, the extra contactor 75, the switch 76 controlled by thermostats and the operation switch 77 may be constructively modified in many ways within the scope of the appended claims.

What we claim is:

1. In a sanitary electric closet, an incinerator and toilet assembly comprising in combination:
   (a) a closet chair having a waste receptacle therein with a selectively closable lower opening therein, and said chair having a composite seat including a closeable and openable top cover means;
   (b) combustion chamber means disposed below said closet chair and lower opening for receiving and incinerating human waste; and including an insulated combustion chamber closed at the bottom and having an openable top, a resistance heating element in said chamber, a gas exhaust outlet connecting said chamber with exterior ventilating means, an electric fan for circulating and exhausting gases from said chamber via said gas outlet, a combustion chamber housing or mantle, and composite combustion chamber top cover and waste receptacle lower cover means, manually operable means extending exteriorly of the chamber means and housing and operatively connected with said cover means to selectively open and close same, and means operatively interconnecting said composite top and said lower cover means to substantially simultaneously uncover the lower opening of the closet chair and the top combustion chamber opening;

(c) an electrical circuit means including insulated electrical conductive leads adapted for connection with an electrical power source and with the resistance heating element in said chamber and with said fan, and including initial operating switch means operatively connected with and responsive to predetermined movement of said composite combustion-chamber-and-waste-receptacle-cover means, thermostatic switch means associated with said combustion chamber and responsive to the temperature therein, and relay means coupled between said leads and said resistance heating element and including actuating coil means, said operating switch means and said thermostatic switch means being electrically connected in series with said actuating coil means, said circuit being energized when the initial operating switch is closed after use of the toilet.

2. A sanitary electric closet as defined in claim 1 wherein the electrical circuit means further includes a normally open thermostatic control switch means positioned in the exhaust outlet from said fan and coupled between said fan and said electrical power source to keep the circuit to said fan closed to energize said fan when the temperature in said exhaust outlet is above a predetermined value.

3. A sanitary closet as defined in claim 1 wherein the electrical circuit means further includes a normally open holding switch closed by said actuating coil to hold the actuating coil energized, even after the initial operating switch means has been disconnected during normal operation of the operating cycle.

4. A sanitary electric closet as claimed in claim 1 in which said electrical circuit means further comprises a normally open lid-actuated switch positioned adjacent the lid when the lid is in the closed position and actuated to the closed position when the lid is in the closed position, said lid actuated switch being in series with said actuating coil for said relay means.

5. A sanitary electric closet as claimed in claim 1 further comprising an ash box removably positioned in said combustion chamber, and said electrical circuit means further comprises a normally open ash box-actuated switch positioned adjacent said ash box when the ash box is in the combustion chamber and actuated to the closed position when the ash box is in the combustion chamber, said ash box actuated switch being in series with said actuating coil for said relay means.

6. A sanitary electric closet as claimed in claim 1 in which said electrical circuit means further comprises a normally open lid-actuated switch positioned adjacent the lid when the lid is in the closed position and actuated to the closed position when the lid is in the closed position, said lid actuated switch being in series with said actuating coil for said relay means, a normally open ash box-actuated switch positioned adjacent said ash box when the ash box is in the combustion chamber and actuated to the closed position when the ash box is in the combustion chamber, said ash box actuated switch being in series with said actuating coil for said relay means.

7. A sanitary electric closet as claimed in claim 1 in which said electrical circuit means further comprises an added relay means and an added operating switch, said added relay means including an actuating coil connected in series with said added operating switch and a holding contact in parallel with said added operating switch and a switch in parallel with said first mentioned operating switch.

8. A sanitary electric closet as claimed in claim 7 in which said electrical circuit means further comprises a normally closed thermostatically operated switch in series with said added operating switch and said added relay coil and having a thermostatic heating element for opening said thermostatically operated switch in series with an added switch in said first mentioned relay.

9. A sanitary closet as defined in claim 1 wherein the composite top and lower cover means of paragraph (b) include:

(a) a top insulated, generally planar cover for the combustion chamber, said cover having an offset mounting arm and vertically apertured hub on the end thereof to provide lateral uncovering movement of said cover about the axis of said hub;

(b) said lower cover means for the waste receptacle's lower opening including a generally planar cover having an offset mounting arm with a vertically apertured mounting end portion to permit lateral uncovering movement of said lower cover;

(c) a stub shaft mounted with its axis vertical within the housing and adjacent an upper portion of the combustion chamber and adapted to have mounted thereon in superposed parallel fashion the aforesaid top cover and lower cover via their apertured mounting arms;

(d) operating means including a manually operated lever means operatively connected with and to effect lateral uncovering movement of said covers responsive to actuation of said lever means; and (e) means on one of said cover mounting arms engageable with the other of said cover mounting arms to effect similar lateral movement of the latter cover responsive to lateral movement imparted to said first-mentioned cover mounting arm.

10. A sanitary closet as defined in claim 9 wherein the operating means of paragraph (d) further include complemental interengageable pinion and rack means on the mounting hub and lower means respectively, to facilitate lateral uncovering movement of said covers in a plane.

11. A sanitary closet as defined in claim 9 further including resilient means biasing said lever means in a normally combustion-chamber-cover closed position.

12. A sanitary closet as defined in claim 9 wherein the initial actuating electrical switch includes mechanically interengaging switch-closing means carried by said lever means and adapted to close said switch to complete the electrical circuit responsive to manual actuation of said lever.

13. A sanitary closet as defined in claim 9 further including a fixed anchor hub on said stub shaft beneath said hub of said top cover mounting arm, complemental opposed recesses adapted to impart rising axial movement of said chamber cover and arm, responsive to relative rotation of said arms, lost motion means in said first mentioned mounting arm and hub to permit a predetermined lateral pivotal movement of said chamber cover before the means of paragraph (e) of claim 9 engage to move the other cover therewith; and spring means interconnecting said hubs to impart return movement to said covers.

14. A sanitary electric closet as defined in claim 1 further including mechanical interlock means interconnecting the closet top cover means and the combustion chamber cover means to maintain the combustion cover in closed covering position when said closet top cover is in a raised opened position, thereby precluding inadvertant burning of a user of the closet during a combustion cycle.

15. A sanitary closet as defined in claim 14 wherein the mechanical interlock means includes an actuating cam attached to a back edge of the closet seat top cover; a vertically disposed and vertically shiftable locking rod extending between said closet top cover means and said combustion cover with the upper end of said rod adjacent said actuating cam; said combustion chamber cover having a laterally extended portion in which a locking aperture is formed, resilient means normally urging said locking rod in a predetermined raised condition against said actuating cam and with the lower end of said rod positioned above said locking aperture in the combustion chamber cover when said closet seat top cover is in the closed condition, said locking rod being downwardly shifted by said cam responsive to opening of said seat top cover whereby the lower end of the locking rod is inserted into said locking aperture to preclude lateral uncovering movement of the combustion chamber cover.

References Cited

UNITED STATES PATENTS

| | | | |
|---|---|---|---|
| 749,769 | 1/1904 | Wilson | 219—217 |
| 2,279,577 | 4/1942 | Martin | 219—217 X |
| 2,309,885 | 2/1943 | Carman | 4—213 |
| 2,732,564 | 1/1956 | Potts | 4—131 |
| 3,020,559 | 2/1962 | Blankenship et al. | 4—131 |
| 3,098,144 | 7/1963 | Dale | 4—131 |
| 3,251,070 | 5/1966 | Blankenship | 4—131 |

VOLODYMYR Y. MAYEWSKY, Primary Examiner

U.S. Cl. X.R.

4—144, 213; 110—9; 219—217